United States Patent Office 2,758,420
Patented Aug. 14, 1956

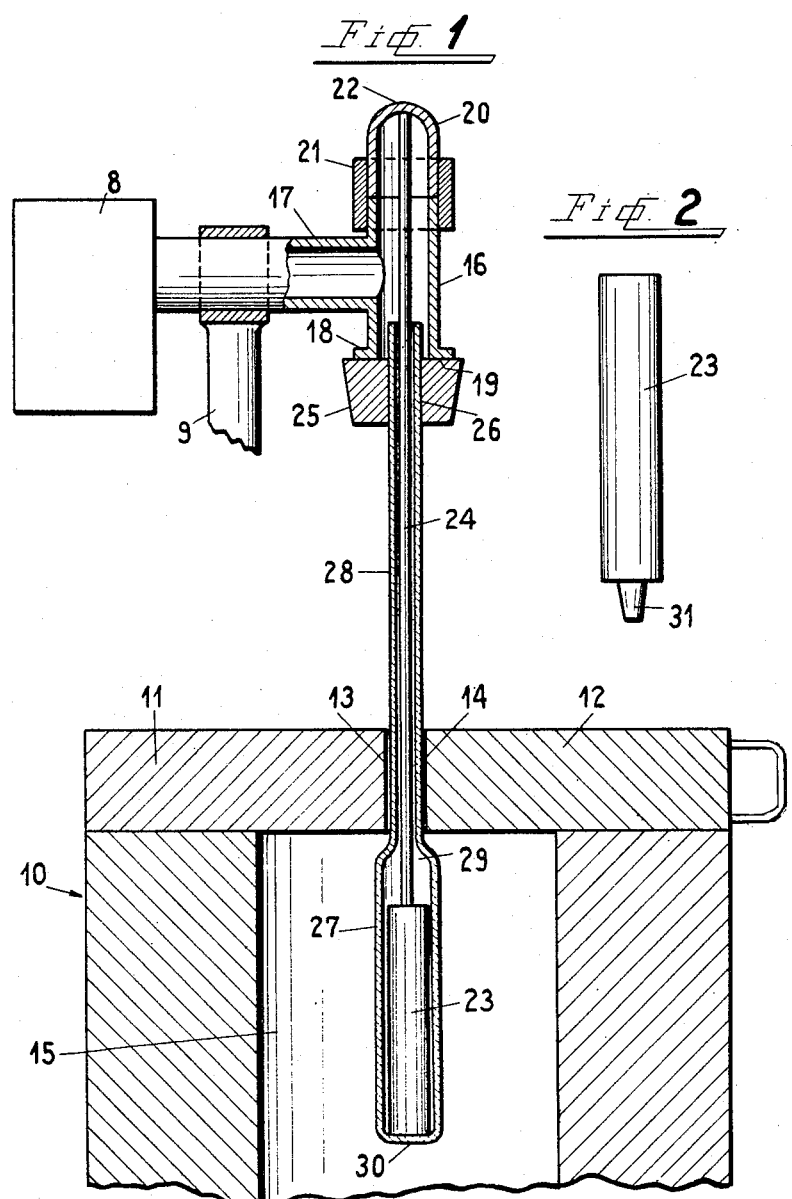

2,758,420
MEANS FOR THERMALLY AFTERMOLDING HOLLOW THERMOPLASTIC BODIES

Egon Johann Honisch, Rapperswil, Switzerland, assignor to Mediglass A. G., Rapperswil, Switzerland Application October 20, 1953, Serial No. 387,269

Claims priority, application Switzerland October 24, 1952

3 Claims. (Cl. 49—7)

My present invention relates to improvements in apparatus for the thermal aftermolding of hollow bodies made of thermoplastic material, in particular glass, to their prescribed precise internal shape. More particularly, my invention relates to means for such aftermolding of hollow bodies including means for fastening and connecting the hollow bodies to be molded, to a nipple which is connected to a vacuum pump.

It is known to bring hollow bodies made of thermoplastic material, in particular glass tubes closed at one end, to their prescribed precise final internal shape by introducing a core of which the contour corresponds to said shape, into the hollow body to be molded, whereupon the material of the hollow body through heating is made plastically deformable and is pressed against the core. Such pressing preferably may be effected, also in a known way and manner, by the atmospheric pressure in that the interior of the hollow body is evacuated by means of a vacuum pump.

Such known method, which seems to be simple enough presents enormous difficulties in practice. When dealing with hollow glass bodies, molding only may take place at relatively high temperatures when the material is incandescent and perfectly soft. The tensile strength of such soft material is extremely low and there is a risk that the core introduced into the hollow body to be molded will sag or sink together with the soft material. In order to avoid such risk, shocks and vibrations of the soft hollow body have to be prevented.

Furthermore, it is essential for obtaining a perfect product to stop the aftermolding process as soon as the walls of the hollow body snugly abut against the core, lest the material, for example glass, stick to the core, since otherwise certain reactions will take place between the glass and the core metal. The period of time required for the aftermolding process, however, cannot at all times be predetermined with sufficient accuracy, since the glass tube stocks supplied by the factory show differences in wall thickness of up to one millimeter. For this reason, the aftermolding process has to be controlled. Direct observation of the hollow bodies during the aftermolding process and while they are in the furnace, is practically impossible, since the walls of the latter cannot be made of transparent material. Therefore, the hollow body together with the enclosed core has to be removed from the furnace from time to time for control purposes. If the walls of the hollow body do not yet sufficiently abut against the core, the body has to be reintroduced into the furnace and then checked over again. During all such handling, any shocks and vibrations of the body must be carefully avoided for the reasons stated above, and such handling has to be done quickly in the interests of efficient production. Up to now such careful and quick handling was not possible in the desired degree, since the connection between the hollow body to be molded and a nipple supporting the latter and connected to the pump, was made by means of a short piece of rubber hose. The latter, however, cannot be engaged with or disengaged from a neck of the hollow body or with and from the nipple without shock, considering the fact that such connection has to be airtight and that the hollow body in the process of aftermolding is subjected to a very high temperature and generally is incandescent.

It is an object of my present invention to provide means for mounting and connecting the hollow bodies which have to be thermoplastically aftermolded, to a supporting nipple of a vacuum pump without using a rubber hose, so that said body may be readily and quickly engaged with and disengaged from said nipple at any time without jarring and jolting for the purpose of checking the deformation of the body.

A further object of my invention is to provide means for mounting and joining the hollow bodies which have to be thermoplastically aftermolded, to a supporting pipe joint connected to a vacuum pump, and of simultaneously preventing the core enclosed in said body from rising or moving under the action of the pump, lest there occur unsightly and useless recesses at the lower, closed end of said body. At said recesses, the glass easily may be folded in acute angles, with the result that the strength at these points decreases so far that the bottom of said body often may chip off without any external cause at all.

A still further object of my invention is to provide means for thermoplastically aftermolding hollow bodies according to precisely described internal dimensions by using a heating device and a core introduced into said body, against which the wall of the softened body is pressed through vacuum action. Such means shall ensure a substantial decrease in the rate of rejections of the finished products.

Further objects will spring from the following description and claims and the accompanying drawing in which:

Fig. 1 shows a portion of the means for molding hollow bodies in vertical action, including a hollow body which has yet to be molded, in the working position, and Fig. 2 is a side view of a single core.

The means comprise an electrical muffle furnace 10 for heating the hollow bodies to be molded. The furnace 10 is covered on top by two stone slabs 11 and 12 which abut against each other. Each slab on its abutment face is provided with a semi-cylindrical recess 13 and 14 respectively, which recesses together form a cylindrical hole. The slab 12 may be drawn off by means of a handle so as to render accessible the interior space 15 of the furnace. Vertically above the hole 13, 14 is situated a vertically extending pipe joint or nipple 16 which is open at both ends. Into said nipple 16 opens laterally a tube 17 which communicates with a vacuum pump 8. The nipple 16 and a portion of tube 17 together form a T-like element which is held in place by a stand 9. The downwardly-pointing end of nipple 16 is surrounded by a flange 18 which comprises a horizontal end face 19 extending around the opening. To the upwardly-pointing end of nipple 16 is connected, in an airtight relation, a dome 20, a rubber sleeve 21 being placed over the nipple 16 and the dome. The dome 20 suitably is made of transparent material such as glass. The top portion 22 of dome 20 serves as abutment which is opposite to the downwardly-pointing end of nipple 16 and the purpose of which is described further below.

The means further comprise a core 23 of which the contours accurately correspond to the inside form of the hollow bodies, a straight rod 24, and a gasket 25. The latter is formed of a body of elastically yielding material such as rubber, and has a central bore 26.

A hollow body to be formed is designated by 27 in Fig. 1 and may be a glass cylinder for example. The core 23 first is introduced into cylinder 27, whereupon the upper end or mouth of the latter is fused on a glass tube 28 which as a rule has a smaller diameter than the cylinder 27. In this manner, the suction aperture 29 of the hollow cylinder 27 is provided with a neck formed by tube 28. The gasket 25 is set over the upper end of tube 28. The rod 24 is passed through tube 28 and suction orifice 29 until the lower end of the rod abuts against the core 23.

In order to introduce the hollow body 27 to be formed into the space 15 of furnace 10, the stone slab 12 is drawn off. When the tube 28 is in recess 13, the slab 12 is moved against the other slab 11 so that tube 28 now passes through the hole 13, 14. Gasket 25 then is applied from below flatly on to the horizontal end face 19 of nipple 16. By virtue of the subpressure produced by means of pump 8, the gasket 25, together with the hollow cylinder 27 and core 23, is retained on the nipple 16. The hollow body 27 thus is solely suspended by virtue of the suction of the vacuum pump. The gasket 25 is moved on tube 28 to such a position that the upper end of rod 24 just contacts the abutment 22 when gasket 25 abuts against the end face 19 of nipple 16.

When the material of hollow cylinder 27 in furnace 10 is softened through heating, the atmospheric pressure presses the wall of the hollow cylinder snugly against core 23. Rod 24 is instrumental in preventing that portion of hollow cylinder 27 which is situated above core 23, from being entirely cut off from the vacuum pump. Rod 24, furthermore, prevents core 23 from rising, which otherwise might occur under the influence of the outside pressure, whereby the closed bottom 30 of the hollow cylinder would be pushed inwardly.

When it is desired to check the progress of the aftermolding operation and for such purpose to take the hollow cylinder 27 from furnace 10, first the slab 12 is drawn off, and then the gasket 25 is removed from the end face 19. This may be effected practically without jarring and very quickly by slightly deforming the gasket 25 to permit air to flow into nipple 16 and to stop the pump suction. Instead of withdrawing the gasket 25, the vacuum may be broken by means of an air intake cock (not shown). If the aftermolding process has not yet proceeded sufficiently far, the hollow cylinder 27 is reintroduced into the furnace in the above-mentioned way and manner and connected to the vacuum pump by pressing the gasket 25 on to nipple 16. When the molding operation has been completed, the hollow body is allowed to cool off and become rigid. Finally, the formed hollow body is cut off at the suction aperture 29, and the core 23 is removed from said body.

Obviously, the core does not in each case have to have the form shown. As shown in Fig. 2, the core for example may comprise on its lower end face a conical lug 31 adapted to produce a complementary bottom during the molding of the hollow body. The core, however, also could be entirely conical or be of non-circular cross-section.

When the hollow body to be formed does not have a relatively large diameter, the tube 28 may be dispensed with if desired, in which case the upper portion of the hollow body simply is raised above the furnace and provided directly with the gasket 25.

The method described and the means shown permit an operator to efficiently produce hollow bodies having the prescribed accurate internal dimensions, and to quickly check and control the working method while avoiding detrimental jarring so as to substantially reduce the rate of rejections.

Having thus described my invention, what I claim as new and desire to secure by Letters Patent, is:

1. A system for the aftermolding of a hollow body made of thermoplastic material and having a mouth; comprising core means disposed within said body, rod means extending from said core means through and beyond the mouth of said body, a tubular member provided with a closed end and with an open end, said tubular member being disposed about said rod means with said closed end abutting against the end of said rod means remote from said core, seal means providing an airtight connection between said open end of said tubular member and said mouth of said hollow body, and evacuation means in communication with said tubular member, whereby upon evacuating said tubular member and heating said hollow body to plastic state said hollow body may be shaped to conform to said core means, said rod means stabilizing said hollow body and said tubular member.

2. A system for the aftermolding of a hollow body made of thermoplastic material and having a mouth; comprising a tubular member having a pair of ends and a transversely extending leg, one end of said member being sealed off and the other end being open, evacuating means communicating with the interior of said tubular member through said leg, tube means for joinder to the mouth of said hollow body, gasket means disposed about said tube means for contact with said open end of said member, core means for positioning within said hollow body and providing a form for said aftermolding operation, and rod means extending through said tube means and said tubular member from said core means to said sealed end of said member, whereby application of vacuum to said leg after joinder of said tube means to said hollow body serves to hold said gasket means to said open end so that upon heating said hollow body to plastic state the latter will assume the shape of said core means, said rod means preventing collapse of said hollow body toward said tubular member.

3. A system according to claim 2, said open end of said tubular member being provided with a flange for cooperation with said gasket means.

References Cited in the file of this patent

UNITED STATES PATENTS

| 2,006,818 | Zimber | July 2, 1935 |
| 2,084,811 | Keen | June 22, 1937 |
| 2,458,934 | Everett | Jan. 11, 1949 |
| 2,531,394 | Campbell | Nov. 28, 1950 |
| 2,657,846 | Schmalz | Nov. 3, 1953 |